United States Patent
Buchmueller et al.

(10) Patent No.: US 11,112,030 B2
(45) Date of Patent: Sep. 7, 2021

(54) VALVE CARTRIDGE FOR AT LEAST ONE SANITARY FITTING WITH A CHANGEABLE FUNCTION

(71) Applicant: Grohe AG, Hemer (DE)

(72) Inventors: Janik Buchmueller, Schwerte (DE); Turgut Kinikarslan, Witten (DE); Frank-Thomas Luig, Menden (DE)

(73) Assignee: Grohe AG, Hemer (DE)

( * ) Notice: Subject to any disclaimer, the term of this patent is extended or adjusted under 35 U.S.C. 154(b) by 163 days.

(21) Appl. No.: 16/545,261

(22) Filed: Aug. 20, 2019

(65) Prior Publication Data
US 2020/0056723 A1 Feb. 20, 2020

(30) Foreign Application Priority Data
Aug. 20, 2018 (DE) ............... 10 2018 120 203.2

(51) Int. Cl.
*F16K 43/00* (2006.01)
*F16K 41/08* (2006.01)
*E03C 1/04* (2006.01)

(52) U.S. Cl.
CPC .......... *F16K 41/086* (2013.01); *E03C 1/0401* (2013.01); *E03C 1/0404* (2013.01)

(58) Field of Classification Search
CPC ........ F16K 3/08; F16K 11/074; F16K 27/044; F16K 31/52483; F16K 31/0617; F16K 41/086
See application file for complete search history.

(56) References Cited

U.S. PATENT DOCUMENTS

| 4,397,330 | A | | 8/1983 | Hayman | |
|---|---|---|---|---|---|
| 4,423,752 | A | | 1/1984 | Psarouthakis | |
| 5,010,917 | A | * | 4/1991 | Iqbal | F16K 3/08 137/454.6 |
| 5,732,734 | A | * | 3/1998 | Buccicone | F16K 3/08 137/454.6 |
| 2013/0036857 | A1 | * | 2/2013 | Huang | F16K 31/60 74/543 |

(Continued)

FOREIGN PATENT DOCUMENTS

| DE | 2841998 A1 | 4/1980 |
|---|---|---|
| DE | 20008679 U1 | 8/2000 |

(Continued)

*Primary Examiner* — Reinaldo Sanchez-Medina
(74) *Attorney, Agent, or Firm* — Muncy, Geissler, Olds & Lowe, P.C.

(57) ABSTRACT

A valve cartridge for a sanitary fitting having a cartridge housing, a valve stem which is rotatable about an axis of rotation relative to the cartridge housing, a handle for rotating the valve stem, a passage disk with a first passage and a second passage, a control disk rotatable with the valve stem for controlling a liquid flow through the first passage or the second passage of the passage disk, a handle adapter which can be connected to the valve stem for setting a first rotational orientation of the valve stem to the handle in a first position and can be connected to the valve stem for setting a second rotational orientation of the valve stem to the handle in a second position, so that the control of the flow of liquid through the first passage or the second passage can be changed by the control disk.

11 Claims, 4 Drawing Sheets

(56) References Cited

U.S. PATENT DOCUMENTS

2013/0068063 A1\*  3/2013  Huang ................. F16K 31/605
                                                          74/543
2016/0341325 A1\*  11/2016  Ye ..................... G05D 23/1313
2018/0059693 A1    3/2018  Rodriguez
2018/0320793 A1\*  11/2018  Choi ................... F16K 11/044

FOREIGN PATENT DOCUMENTS

DE        10133033 A1    1/2003
EP         2418409 A1    2/2012
GB         1461381 A     1/1977

\* cited by examiner

US 11,112,030 B2

VALVE CARTRIDGE FOR AT LEAST ONE SANITARY FITTING WITH A CHANGEABLE FUNCTION

This nonprovisional application claims priority under 35 U.S.C. § 119(a) to German Patent Application No. 10 2018 120 203.2, which was filed in Germany on Aug. 20, 2018, and which is herein incorporated by reference.

BACKGROUND OF THE INVENTION

Field of the Invention

The invention at hand relates to a valve cartridge for at least one sanitary fitting with which the flow of a liquid through at least one liquid line of the at least one sanitary fitting can be controlled. Sanitary fittings are used in particular for the needs-based provision of a liquid to a utility sink, sink, shower, and/or bathtub.

Description of the Background Art

Valve cartridges are regularly inserted into a fitting housing of the sanitary fitting or into a functional unit of a flush-mounted built-in body. The flow of liquid to one or more liquid discharge points or sanitary fittings, such as, for example, overhead shower heads and hand-held shower heads of a shower, can be controlled by a valve cartridge. To shut off a bathtub thermostat (two outlets for the liquid) and to shut off a shower thermostat (either one or two simultaneously controlled outlets for the liquid), different valve cartridges are required, for example, in the form of an Aquadimmer and a (left-closing or right-closing) upper part. These have different geometries for the liquid supply or liquid discharge, so that at least two different fitting housings or fitting housing inserts are required. This increases the number of parts and costs.

SUMMARY OF THE INVENTION

It is therefore an object of the invention to solve at least partially the problems described with reference to the state of the art and in particular to provide a valve cartridge that can be adapted with little effort to different applications without changing the liquid supply or liquid discharge and for which thus no different fitting housings or fitting housing inserts are necessary.

A valve cartridge for at least one sanitary fitting according to an exemplary embodiment includes a cartridge housing, a valve stem which is rotatable about an axis of rotation relative to the cartridge housing, a handle for rotating the valve stem, a passage disk with a first passage and a second passage, a control disk rotatable with the valve stem for controlling a liquid flow through the first passage or the second passage of the passage disk, a handle adapter which can be connected to the valve stem for setting a first rotational orientation of the valve stem to the handle in a first position and can be connected to the valve stem for setting a second rotational orientation of the valve stem to the handle in a second position, so that the control of the flow of liquid through the first passage or the second passage can be changed by means of the control disk.

The valve cartridge can be used in particular for at least one sanitary fitting or at least one flush-mounted built-in body for at least one sanitary fitting. Sanitary fittings are used in particular for the needs-based provision of liquids, such as in particular water, to utility sinks, sinks, showers, and/or bathtubs. For this purpose, the sanitary fittings or flush-mounted built-in bodies can be supplied with cold water with a cold water temperature and hot water with a hot water temperature, which can be mixed by the sanitary fittings or flush-mounted built-in bodies, for example, by means of a mixing valve or a thermostatic mixing cartridge, to a mixed water with a desired mixed water temperature. The cold water temperature is in particular at most 25° C. (Celsius), preferably 1° C. to 25° C., particularly preferably 5° C. to 20° C., and/or the hot water temperature is in particular at most 90° C., preferably 25° C. to 90° C., particularly preferably 55° C. to 65° C. The mixed water can then be supplied, for example, via at least one liquid line of at least one sanitary fitting, such as, for example, a hand-held shower head, an overhead shower head, nozzle, spout, and/or the like, on a shower, bathtub, and/or sink. The proposed valve cartridge can be inserted, for example, into a fitting housing of the sanitary fitting and/or into a functional unit of a flush-mounted built-in body of a sanitary fitting to control flow of the liquid through the at least one liquid line.

For this purpose, the valve cartridge has a cartridge housing and a valve stem, which is rotatable about an axis of rotation relative to the cartridge housing. The cartridge housing can consist at least partially of plastic and/or metal, such as, for example, brass. The cartridge housing can also be designed in the manner of a headpiece. The valve stem is at least partially mounted within the cartridge housing and/or can be rotated by a user about the axis of rotation relative to the cartridge housing with a handle of the valve cartridge. A control disk is attached nonrotatably to the valve stem and is rotatable on a passage disk about the axis of rotation with the valve stem. The passage disk has a first passage and a second passage. In the assembled state of the valve cartridge, the first passage can be connected to a first liquid line for a first sanitary fitting and/or the second passage to a second liquid line for a second sanitary fitting. Flow of liquid through the first passage and/or the second passage of the passage disk can be controlled by means of the control disk.

The valve cartridge further has a handle adapter. The handle adapter can be connected to the valve stem in a first position and in a second position. For this purpose, the valve stem can have a rib which, depending on the desired position of the handle adapter, engages either in a first groove of the handle adapter or in a second groove of the handle adapter. In the first position of the handle adapter, the valve stem is in a first rotational orientation and in the second position of the handle adapter in a second rotational orientation relative to the handle. By changing the position of the handle adapter, the valve stem thus assumes a different rotational position at the same angle of rotation of the handle (in relation to the cartridge housing). Because the control disk is nonrotatably connected to the valve stem, thereby the control of the flow of liquid through the first passage and/or the second passage can be switched or changed. For example, it can be set by this means that in the first position of the handle adapter both passages can be controlled or released by the valve cartridge or the control disk of the valve cartridge and/or in the second position of the handle adapter only one of the two passages can be controlled or released by the valve cartridge or the control disk of the valve cartridge. By changing the position of the handle adapter, the function of the valve cartridge can thus be adjusted as required for the respective sanitary fitting or the respective flush-mounted built-in body without having to change the course or the geometric position of the liquid supply to the valve cartridge or the liquid discharge from the valve cartridge in the sanitary fitting or the flush-mounted built-in body.

The handle adapter can be mounted on the valve stem in the first position and the second position. For this purpose, the handle adapter can be formed at least partially sleeve-shaped. In addition, the handle adapter in the first position and/or the second position can be attached (releasably) with a clip connection to the valve stem. The handle adapter can be repositioned between the first position and the second position.

The first position of the handle adapter and the second position of the handle adapter can be rotated by 120° to one another about the axis of rotation.

The passage disk can have a first sector, a second sector, and a third sector, which are arranged offset to one another by 120° about the axis of rotation, wherein the first passage is disposed in the second sector and the second passage in the third sector. The sectors can be formed in the manner of circular sectors (of equal size) and/or each have a central angle of 120°. The sectors can therefore each be formed pie-shaped.

The control disk can have an opening for releasing the first passage or the second passage. The opening can be formed, for example, in the manner of a bore through the control disk or a cutout. In particular, the opening has a size that corresponds at most to a size of one of the sectors of the passage disk. The control disk releases the first passage and/or the second passage when the opening of the control disk overlaps at least partially the first passage and/or the second passage. In this way, the liquid can flow out of an inlet chamber of the valve cartridge through the opening and the first passage and/or through the opening and the second passage, for example, to a first sanitary fitting and/or second sanitary fitting.

In the first position of the handle adapter, the first passage and the second passage can be closed by the control disk in a closed position of the handle. The closed position of the handle is in particular a 0° position and/or 12 o'clock position of the handle (relative to the cartridge housing).

The first passage or the second passage can be released by the control disk by a rotation of the handle about the axis of rotation. In particular, the first passage or the second passage can be released by the control disk, in particular completely, by a rotation of the handle by 120° about the axis of rotation. For example, when the handle is rotated counterclockwise from the closed position, the first passage can be released at least partially and/or when the handle is rotated clockwise from the closed position, the second passage can be released at least partially. Furthermore, the valve cartridge can have a stop element, for example, in the manner of a stop ring, by which an angle of rotation of the handle can be limited to 120°. The stop element can be designed such that the handle can only be rotated counterclockwise or only clockwise, in particular by 120°, from the closed position. Alternatively, the valve cartridge can have a stop element by which the angle of rotation of the handle can be limited to 240°. The stop element can be designed such that the handle can be rotated 120° counterclockwise and 120° clockwise from the closed position.

In the second position of the handle adapter, the first passage or the second passage can be released by the control disk in a closed position of the handle. In order to prevent the liquid from flowing out through the released passage in the closed position of the handle, the released passage or a liquid line downstream of the released passage can be closed in a fluid-tight manner with a closing element, for example, a stopper, so that no liquid can flow via the passage released in the closed position of the handle.

The passage, released by the control disk in the closed position of the handle, can be closed by a closing element.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
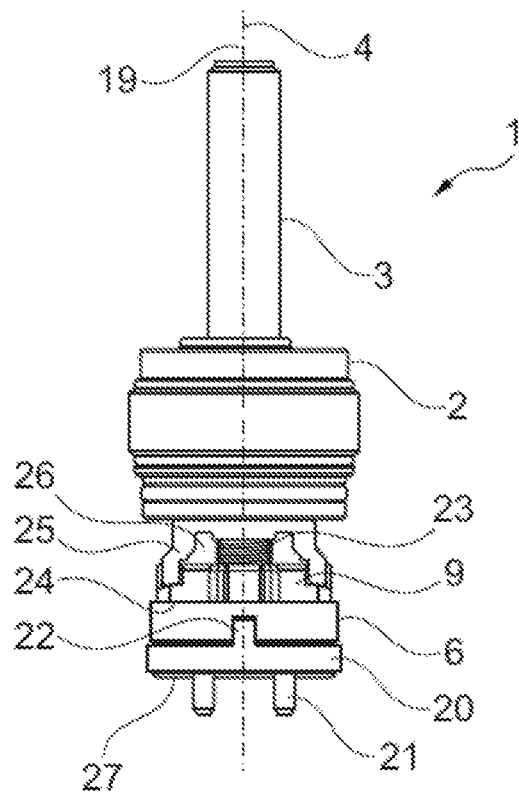
FIG. 1 shows a valve cartridge in a side view.

FIG. 1 shows a valve cartridge 1 in a side view. Valve cartridge 1 has a cartridge housing 2 in the manner of a headpiece. Cartridge housing 2 can be screwed, for example, into a housing of a sanitary fitting. A valve stem 3, which is rotatably mounted in cartridge housing 2 about an axis of rotation 4, extends through cartridge housing 2. Axis of rotation 4 extends concentrically here to a longitudinal axis 19 of valve stem 3. A bottom part 20 is attached at a longitudinal end of valve stem 3.

Bottom part 20 has on its underside first pins 21, with which the bottom part is held nonrotatably, for example, on the housing of the sanitary fitting after valve cartridge 1 has been mounted. At the same time, bottom part 20 is rotatably attached to valve stem 3, so that valve stem 3 is rotatable relative to bottom part 20 after valve cartridge 1 has been mounted. A passage disk 6, which is held on the top side of bottom part 20 by second pins 22 nonrotatably relative to bottom part 20, is mounted on bottom part 20.

A control disk 9, which is pressed by a spring element 23 onto passage disk 6, is disposed on passage disk 6. As a result, a sealing plane 24 is formed between control disk 9 and passage disk 6. Control disk 9, passage disk 6, and bottom part 20 together form a disk package. Stem arms 25 of valve stem 3 engage in control disk 9, so that control disk 9 can be rotated on passage disk 6 by rotating valve stem 3 about axis of rotation 4. Control disk 9 is thus rotatable relative to passage disk 6. Passages 7, 8 (not visible here) in control disk 9 can be released by rotating control disk 9. In the mounted state of valve cartridge 1, a liquid can laterally run into an inlet chamber 26. Inlet chamber 26 is formed between cartridge housing 2 and control disk 9. If at least one of the passages 7, 8 formed in passage disk 6 is released by control disk 9, the liquid can flow through the respective passages 7, 8 parallel to longitudinal axis 19 in the direction of a valve seat 27 formed on an underside of bottom part 20.

Figure 2:
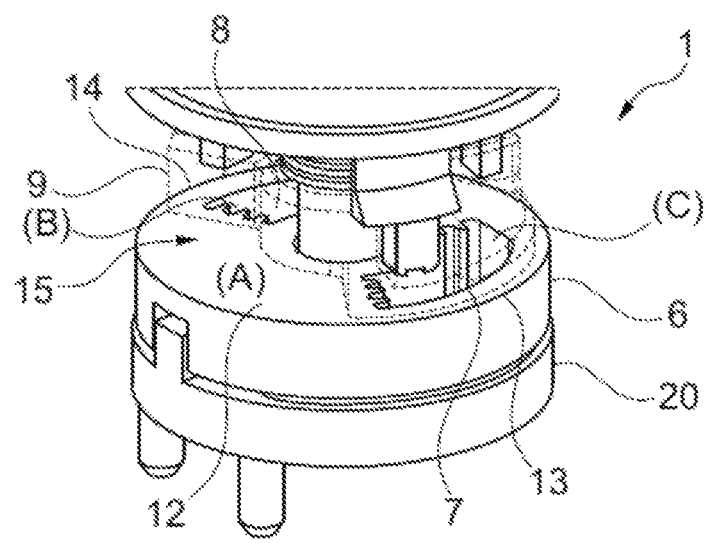
FIG. 2 shows a detailed view of the valve cartridge in a perspective view.

FIG. 2 shows a detailed view of valve cartridge 1 in a perspective illustration in the region of passage disk 6. Control disk 9, disposed rotatably on passage disk 6, is shown as transparent here. Bottom part 20 and passage disk 6 are circular. Control disk 9 is also circular, wherein it has an opening 15 in the form of a cutout shaped as an annular segment. Opening 15 is here rotated in a first sector 12 of passage disc 6, in which no passage 7, 8 is formed. First passage 7 formed in a second sector 13 of passage disk 6 and second passage 8 formed in a third sector 14 are here concealed by control disk 9, so that no liquid can flow out of inlet chamber 26, shown in FIG. 1, through passages 7, 8. Valve cartridge 1 is thus closed in the shown rotational position of control disk 9.

Figure 3:
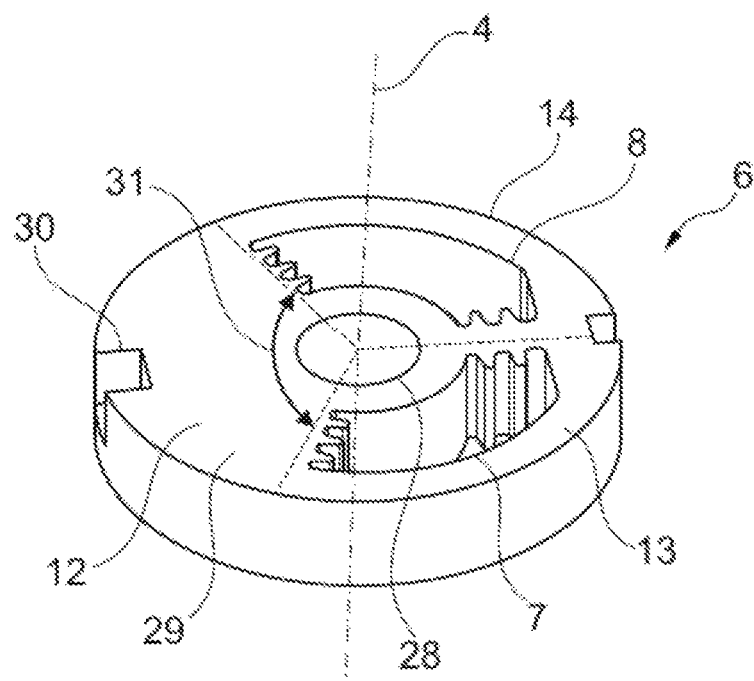
FIG. 3 shows a passage disk of the valve cartridge in a perspective view.

FIG. 3 shows passage disk 6 in a perspective view. The passage disk has in its center a stem opening 28 through which the stem extends in the mounted state of passage disk 6. Furthermore, passage disk 6 has on its upper side 29 two recesses 30 in which stem arms 25, shown in FIG. 1, engage. Upper side 29 of passage disk 6 is subdivided into a first sector 12, a second sector 13, and a third sector 14 (shown using dashed lines). Sectors 12, 13, 14 are formed in the manner of circular sectors (of equal size) and/or each have a central angle 31 of 120°. First passage 7 is located in second sector 13 and second passage 8 in third sector 14. Passages 7, 8 are each formed arc-shaped and extend parallel to axis of rotation 4 completely through passage disk 6. Furthermore, passages 7, 8 have a noise-reducing geometry in the form of a sawtooth profile at their inflow edges. In addition, passage disk 6 is formed mirror-symmetrical.

Figure 4:
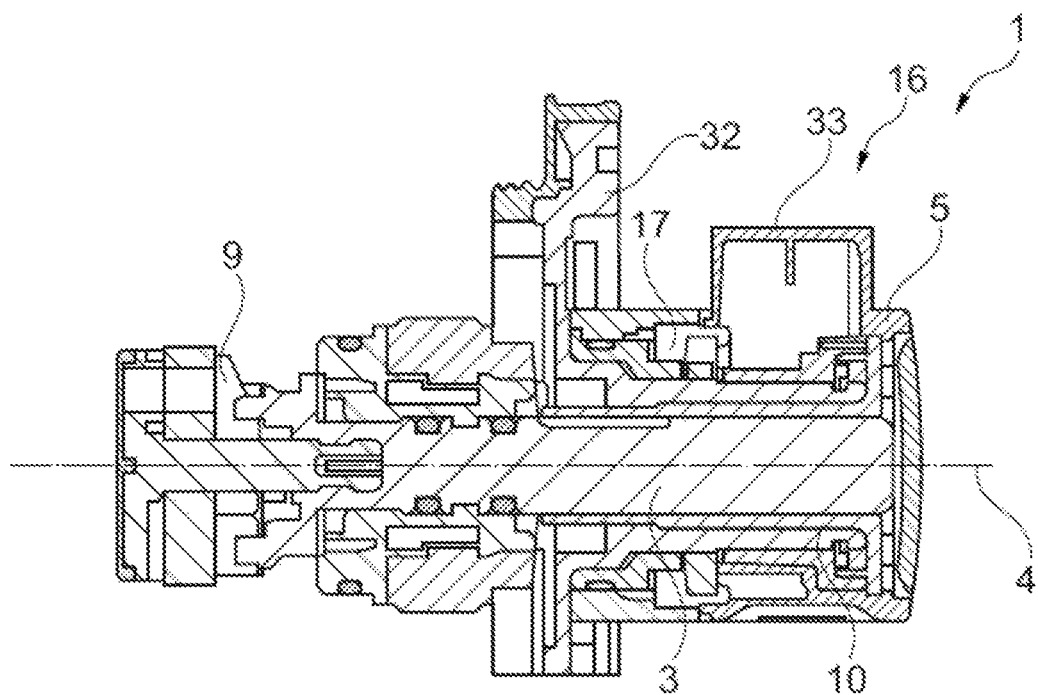
FIG. 4 shows the valve cartridge with mounted handle in a longitudinal section.

FIG. 4 shows valve cartridge 1 with mounted handle 5 in a longitudinal section. Valve cartridge 1 is mounted here on a support plate 32. A handle adapter 10, via which handle 5 is connected nonrotatably to stem 3, is attached to valve stem 3. Valve cartridge 1 is thus operable by a user by rotating handle 5 about axis of rotation 4. Handle 5 is in a closed position 16 here in which valve cartridge 1 is closed. In closed position 16 there is a radially outwardly extending handle element 33 at a 0° position or 12 o'clock position. Furthermore, the valve cartridge comprises a stop element 17 in the manner of a stop ring by which an angle of rotation of handle 5, stem 3, and control disk 9 is limited.

Figure 5:
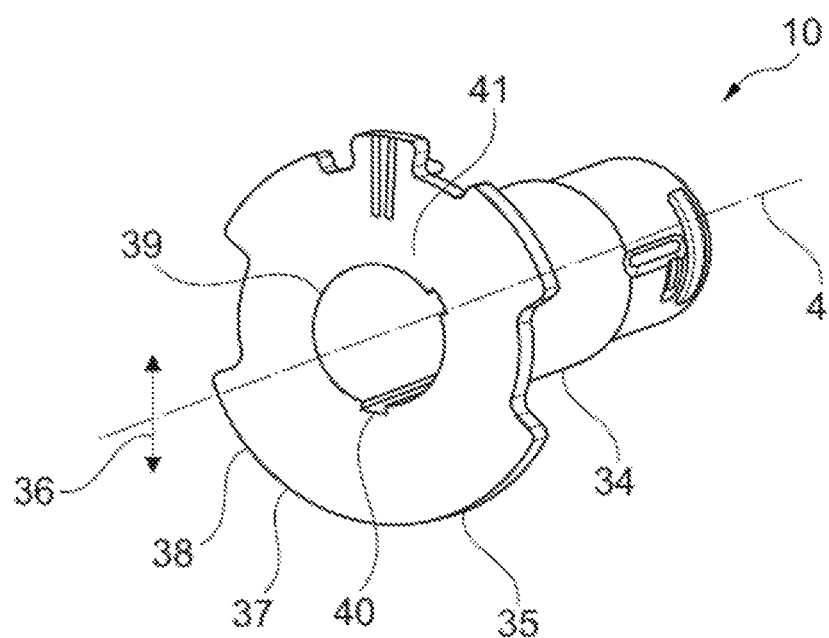
FIG. 5 shows a handle adapter of the valve cartridge in a perspective view.

FIG. 5 shows handle adapter 10 in a perspective view. Along axis of rotation 4, handle adapter 10 has a sleeve-shaped section 34, with which handle adapter 10 can be attached nonrotatably to valve stem 3. Further, handle adapter 10 can be locked to valve stem 3. At one longitudinal end, the handle adapter has a flange section 35 which extends from sleeve-shaped section 34 in a radial direction 36 (perpendicular to axis of rotation 4). On its circumferential surface 37, flange section 35 can have a toothing 38 via which handle adapter 10 can be connected nonrotatably to handle 5. Handle adapter 10 has a first groove 40 and a second groove 41 at an inner diameter 39. First groove 40 and second groove 41 extend in inner diameter 39 parallel to axis of rotation 4. Further, first groove 40 and second groove 41 are arranged about axis of rotation 4 offset by 120° to one another. First groove 40 is at a 6 o'clock position here and second groove 41 at a 2 o'clock position.

Figure 6:
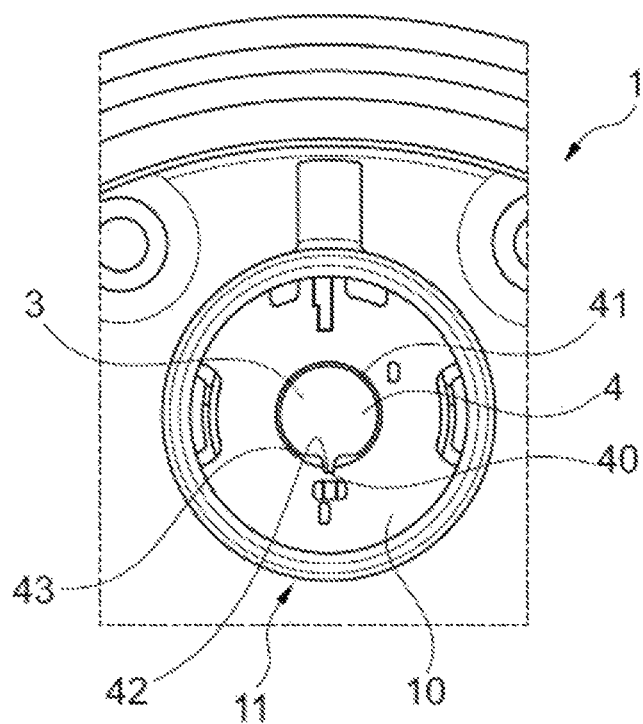
FIG. 6 shows the valve cartridge with mounted handle in a front view.

FIG. 6 shows valve cartridge 1 of FIG. 4 in a front view. Handle adapter 10 is here attached to valve stem 3 in a first position 11. In first position 11, a rib 42 of valve stem 3, said rib extending parallel to axis of rotation 4 (which runs perpendicular to the plane of the drawing), engages in first groove 40 of handle adapter 10. This determines a first rotational orientation of valve stem 3 to handle 5. Rib 42 is formed on an outer surface 43 of valve stem 3. Handle adapter 10 can be connected to valve stem 3 in a second position. For this purpose, handle adapter 10 is released by valve stem 3 and placed on valve stem 3 such that rib 42 engages in second groove 41 instead of in first groove 40. For this purpose, valve stem 3 must be rotated by 120° to handle adapter 10. Valve stem 3 is then in a second rotational orientation to handle 5. Compared with first position 11, in the second position of handle adapter 10, valve stem 3 is rotated by 120° to handle adapter 10 and to handle 5 about axis of rotation 4.

Figure 7:
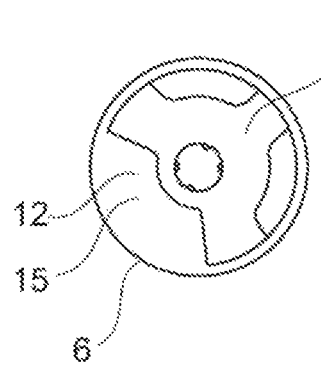
FIG. 7 shows a control disk of a first variant of the valve cartridge in a closed position.
Figure 8:
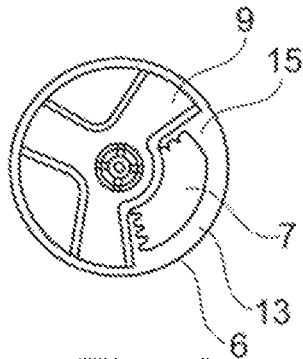
FIG. 8 shows the control disk of the first variant of the valve cartridge in a first release position.

FIGS. 7 to 12 show different positions of control disk 9 with respect to passage disk 6 as a function of the positions of handle adapter 10 and the angle of rotation of handle 5. Passage disk 6 and control disk 9 are each shown in a plan view. FIGS. 7 and 8 show passage disk 6 and control disk 9 in a first configuration of valve cartridge 1, in which handle adapter 10 is attached to valve stem 3 in first position 11 (cf. FIG. 6). In FIG. 7, handle 5 is in closed position 16, which may be a 0° position and/or 12 o'clock position. Opening 15 of control disk 9 is rotated into first sector 12 of passage disk 6, a sector in which there is no passage 7, 8. Valve cartridge 1 is closed thereby. FIG. 8 shows a position of control disk 9 after control disk 9 has been rotated counterclockwise by 120° with handle 5 and valve stem 3. Opening 15 of control disk 9 is now in second sector 13 of passage disk 6, so that first passage 7 is released. A liquid can thus flow away through passage 7. In the first configuration of valve cartridge 1, valve cartridge 1 has the stop element 17 shown in FIG. 13, by which an angle of rotation 18 of handle 5 is limited to 120°. For this purpose, stop element 17 has a first stop 44 and a second stop 45 for handle 5. Control disk 9 can be moved thereby from the closed position shown in FIG. 7 only by 120° counterclockwise into the release position of first passage 7 shown in FIG. 8. In the first configuration, valve cartridge 1 is therefore designed in the manner of a (right-closing) upper part with which the flow of liquid of only one sanitary fitting can be controlled.

Figure 9:
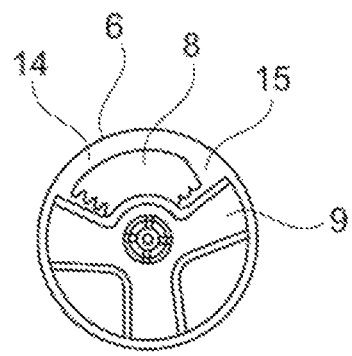
FIG. 9 shows a control disk of a second variant of the valve cartridge in a second release position.
Figure 14:
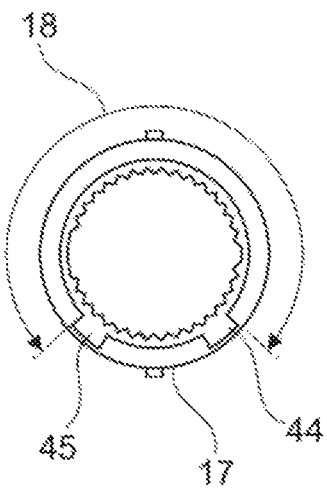
FIG. 14 shows a second variant of a closing element.

FIG. 9 shows a second configuration of valve cartridge 1, which differs from the first configuration only by stop member 17 shown in FIG. 14. Stop element 17 shown in FIG. 14 limits the angle of rotation 18 of handle 5 to 240°. In the second configuration, control disk 9 can be moved not only into the closed position shown in FIG. 7 and into the release position of first passage 7 as shown in FIG. 8, but additionally from the closed position shown in FIG. 7 clockwise by 120° into the release position of second passage 8 as shown in FIG. 9. In this position, opening 15 of control disk 9 is located in the region of third sector 14 of passage disk 6, the sector in which second passage 8 is located. As a result, the liquid can flow away via second passage 8. In the second configuration, valve cartridge 1 is therefore designed in the manner of an Aquadimmer, with which the flow of liquid of two sanitary fittings can be controlled.

Figure 10:
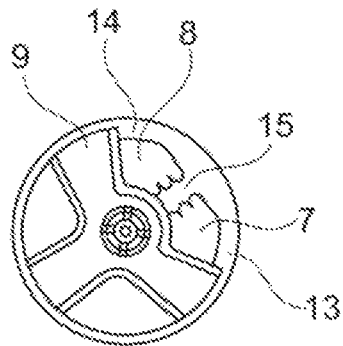
FIG. 10 shows a control disk of a third variant of the valve cartridge in a third release position.
Figure 15:
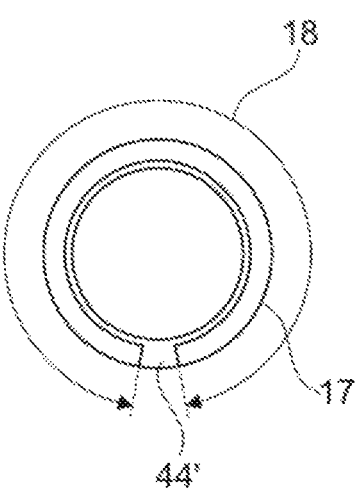
FIG. 15 shows a third variant of a closing element.

FIG. 10 shows a third configuration of valve cartridge 1, which differs from the first and second configurations only by stop element 17 shown in FIG. 15. Stop element 17 shown in FIG. 15 limits the angle of rotation 18 of handle 5 to 360°. For this purpose, stop element 17 in the embodiment shown in FIG. 15 only has a first stop 44 for handle 5, which is designed here like a trailing stop. As a result, control disk 9 can be rotated from the closed position shown in FIG. 7 not only into the positions shown in FIGS. 8 and 9, but additionally into the position shown in FIG. 10. Here, control disk 9 was rotated from the position shown in FIG. 7 (closed position 16 of handle 5) by 180° clockwise or counterclockwise, so that opening 15 of control disk 9 is located partially in second sector 13 and third sector 14 of passage disk 6. As a result, both first passage 7 and second passage 8 are at least partially releasable (simultaneously). In the third configuration, valve cartridge 1 is therefore also designed in the manner of an Aquadimmer, with which the flow of liquid of two sanitary fittings can be controlled, wherein here the flow of liquid can be activated simultaneously for both sanitary fittings.

Figure 11:
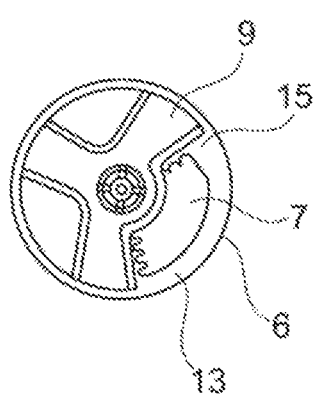
FIG. 11 shows a control disk of a fourth variant of the valve cartridge in a closed position.
Figure 12:
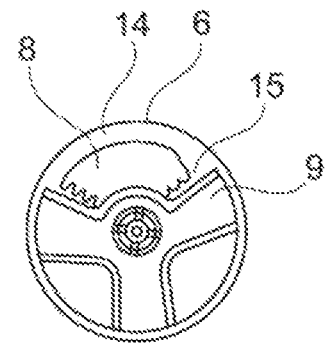
FIG. 12 shows the control disk of the fourth variant of the valve cartridge in a release position.
Figure 13:
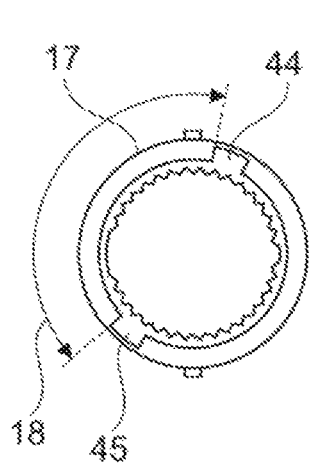
FIG. 13 shows a first variant of a closing element.

FIG. 11 shows a fourth configuration of valve cartridge 1, which differs from the first configuration only in that handle adapter 10 is attached to valve stem 3 in the second position. In FIG. 11, handle 5 is in the closed position 16, which can be the 0° position and/or 12 o'clock position. Because handle adapter 10 is attached to valve stem 3 in the second position, opening 15 of control disk 9 is in the closed position 16 of handle 5 in the region of second sector 13 of passage disk 6, so that first passage 7 is released. In order to prevent the liquid from flowing out through first passage 7 in the closed position 16 of handle 5, first passage 7 and/or a liquid channel adjoining first passage 7 are closed in a liquid-tight manner by a closing element, for example, in the manner of a stopper. In the fourth configuration of valve cartridge 1, it has stop element 17 shown in FIG. 13, which limits the angle of rotation of handle 5 to 120°. FIG. 12 shows control disk 9 after it has been rotated counterclockwise by handle 5 and valve stem 3 by a 120° rotation. As a result, opening 15 of control disk 9 is located in third sector 14 of passage disk 6, so that second passage 8 is released. As a result, the liquid can flow off via the second passage. In the fourth configuration, valve cartridge 1 is also formed in the manner of a (right-closing) upper part, with which the liquid plus only one sanitary fitting can be controlled.

Differently configured valve cartridges with the same fitting housings or the same housing inserts can be employed using the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A valve cartridge for at least one sanitary fitting, comprising:
   a cartridge housing;
   a valve stem that is rotatable about an axis of rotation relative to the cartridge housing;
   a handle for rotating the valve stem;
   a passage disk with a first passage and a second passage;
   a control disk rotatable with the valve stem for controlling a liquid flow through the first passage or the second passage of the passage disk; and
   a handle adapter connectable to the valve stem for setting a first rotational orientation of the valve stem to the handle in a first position and connectable to the valve stem for setting a second rotational orientation of the valve stem to the handle in a second position so that the control of the flow of liquid through the first passage or the second passage is changed via the control disk,
   wherein the handle adapter is non-rotatably fixed to the valve stem, such that during all rotational movement of the handle, the valve stem and the handle adapter rotate together.

2. The valve cartridge according to claim 1, wherein, in the first position of the handle adapter, the first passage and the second passage are closed by the control disk in a closed position of the handle.

3. The valve cartridge according to claim 2, wherein the first passage or the second passage is released by the control disk by a rotation of the handle about the axis of rotation.

4. The valve cartridge according to claim 1, wherein the handle adapter is mountable on the valve stem in the first position and in the second position.

5. The valve cartridge according to claim 1, wherein the first position of the handle adapter and the second position of the handle adapter are rotated by 120° to one another about the axis of rotation.

6. The valve cartridge according to claim 1, wherein the passage disk has a first sector, a second sector, and a third sector, which are arranged offset to one another by 120° about the axis of rotation, and wherein the first passage is disposed in the second sector and the second passage is disposed in the third sector.

7. The valve cartridge according to claim 1, wherein the control disk has an opening for releasing the first passage or the second passage.

8. The valve cartridge according to claim 1, wherein in the second position of the handle adapter, the first passage or the second passage is released by the control disk in a closed position of the handle.

9. The valve cartridge according to claim 1, wherein the handle adapter is non-rotatably fixed to the handle.

10. The valve cartridge according to claim 1, wherein the valve stem has a rib and the handle adapter has a first groove and a second groove, and wherein in the first position, the rib is engaged in the first groove and in the second position, the rib is engaged in the second groove.

11. A valve cartridge for at least one sanitary fitting, comprising:
    a cartridge housing;
    a valve stem that is rotatable about an axis of rotation relative to the cartridge housing;
    a handle for rotating the valve stem;
    a passage disk with a first passage and a second passage;
    a control disk rotatable with the valve stem for controlling a liquid flow through the first passage or the second passage of the passage disk;

a handle adapter connectable to the valve stem for setting a first rotational orientation of the valve stem to the handle in a first position and connectable to the valve stem for setting a second rotational orientation of the valve stem to the handle in a second position so that the control of the flow of liquid through the first passage or the second passage is changed via the control disk; and a stop element that limits an angle of rotation of the handle about the axis of rotation to 120°, 240°, or >240° to 360.

* * * * *